United States Patent [19]

Deman et al.

[11] 4,305,154
[45] Dec. 8, 1981

[54] TRANSCEIVER

[75] Inventors: Pierre Deman; Albert Pimentel; Jean-Claude Ben Sadou; Charles de Riviere, all of Paris, France

[73] Assignee: Thomson-CSF, Paris, France

[21] Appl. No.: 113,127

[22] Filed: Jan. 17, 1980

[30] Foreign Application Priority Data

Jan. 23, 1979 [FR] France .................. 79 01640

[51] Int. Cl.³ ............................................. H04B 1/46
[52] U.S. Cl. .................................. 455/79; 455/83; 455/116
[58] Field of Search ............... 455/75, 78, 79, 82, 455/83, 116, 218, 221, 296, 308

[56] References Cited

U.S. PATENT DOCUMENTS 3,283,074  11/1966  Csicsatka ........................ 455/79
3,397,401  8/1968   Winterbottom ................. 455/79
3,843,928  10/1974  Nishimura ...................... 455/218

Primary Examiner—Marc E. Bookbinder
Assistant Examiner—Tommy P. Chin
Attorney, Agent, or Firm—Cushman, Darby & Cushman

[57] ABSTRACT

The transceiver according to the invention is controlled by an automatic alternation device in order to permit transmission solely when voice signals are to be transmitted and when the receiver does not receive such signals. On transmission, the transmitter supplies constant amplitude-modulated, high frequency signals during voice activity periods and supplies nothing outside these periods. On reception, a detector for detecting the rapid amplitude transitions of the received signals and a logic circuit control the switching off of an electronic switch during the voice activity periods, so that the output of the receiver only supplies voice signals. The gain of the receiver amplifier is controlled by an automatic control loop. The value of the time constant of this loop is controlled so as to be low during the voice activity periods and high outside these periods.

3 Claims, 1 Drawing Figure

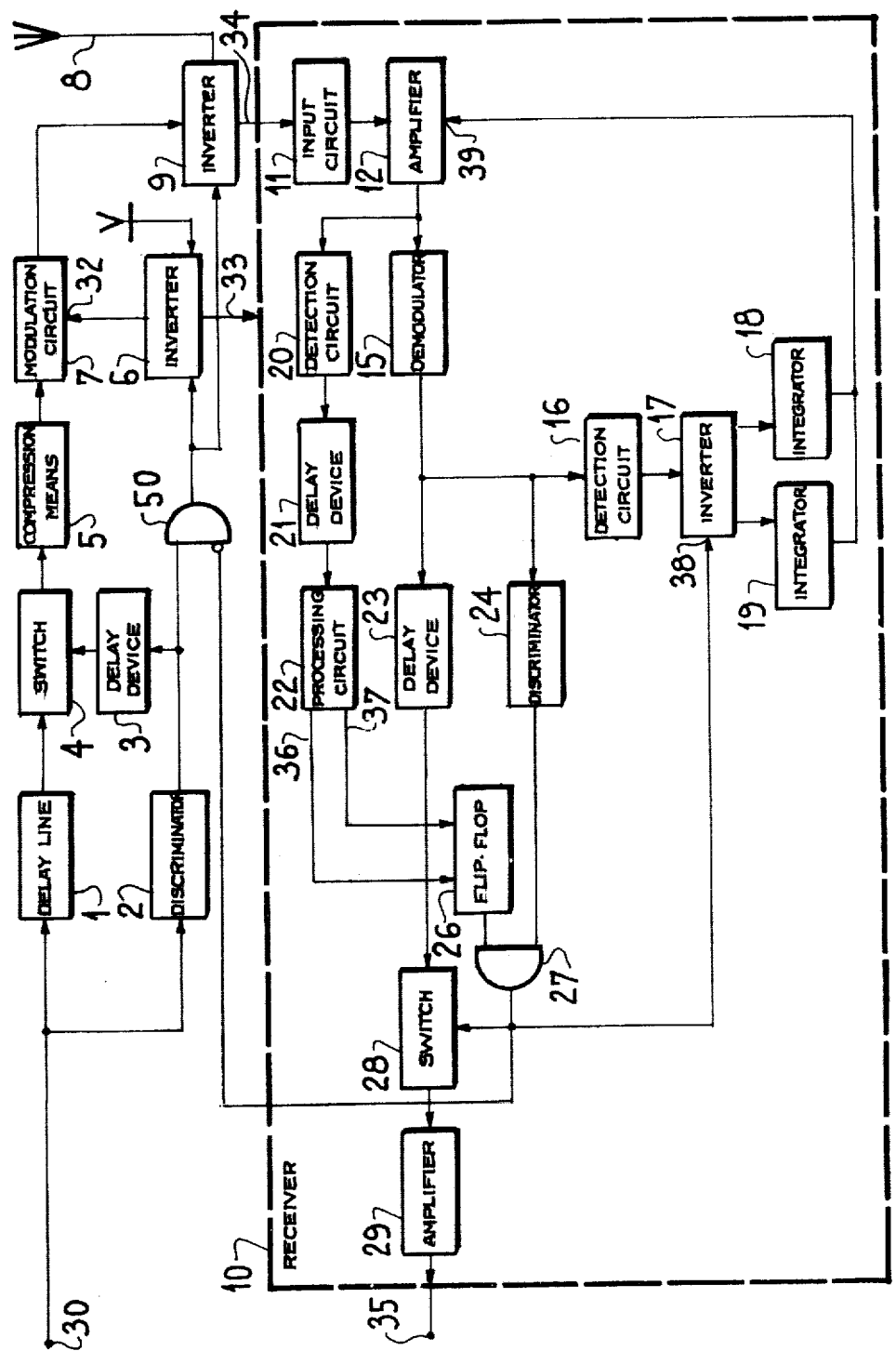

4,305,154

1

TRANSCEIVER

BACKGROUND OF THE INVENTION

The present invention relates to transceivers operating in amplitude modulation with a single side band and having in their transmitter means for compressing the amplitude of the voice modulation signals.

Such transceivers lead to an improvement in the transmission balance due to a significant reduction in the ratio between the peak power and the average power of the modulation signals introduced by the compression means. However, they have the disadvantage of increasing the noise in the absence of voice signals.

These transceivers comprise arrangements including voice-noise discriminators, to eliminate the noise between the voice activity periods. In order to eliminate the noise between the voice activity periods, it is common to use either expensive voice-noise discriminators having good performance, or cheaper voice-noise discriminators with poor performance.

BRIEF SUMMARY OF THE INVENTION

The present invention relates to a voice activity detector having as good performances as the best common voice-noise discriminators but which are cheaper.

This result is achieved, in particular, by a detection of the rapid transitions of the received signals.

According to the invention, there is provided a transceiver comprising:

a transmitter having a signal input and an output for supplying signals only during voice activity periods, these signals being constant amplitude-modulated signals and a receiver having an input, an output, an amplifier circuit having an input coupled to the input of the receiver and an output, a first electronic switch having a first and a second end respectively coupled to the output of the amplifier circuit and to the output of the receiver, and a control input, and control means for controlling the first switch, comprising: detection means for detecting rapid amplitude transitions, having an input coupled to the output of the amplifier circuit, and two outputs for supplying respectively start and finish of voice activity pulses; and a logic circuit having two inputs respectively coupled to the two outputs of the dectection means, and an output coupled to the control input of the first switch for supplying the switching off of the first switch between the start and finish of voice activity pulse.

BRIEF DESCRIPTION OF THE DRAWING

The FIGURE shows a schematic of the transmitter and receiver forming the transceiver of the present invention.

DESCRIPTION OF THE DRAWING AND PREFERRED EMBODIMENTS

The invention is described in greater detail hereinafter relative to non-limitative embodiments and the attached drawing showing a transceiver according to the invention.

In the drawing, an input terminal 30 for receiving the signals to be transmitted is connected on the one hand to the input of a first delay line 1, whose output is connected to the modulation input of a circuit 7 across an electronic switch 4 and series-arranged amplitude compression means 5, and on the other hand to the input of a voice-noise discriminator 2, whose output is connected to the control input of the electronic switch 4 across a first delay device 3, as well as to a first input and an AND-gate 50, whose output is connected to the control input of two electronic inverters 6 and 9. The second complementary input of the AND-gate 59 is connected to the output of an AND-gate 27 of receiver 10.

The circuit 7 comprises the conventional high frequency amplification and modulation stages.

The electronic inverter 6 makes it possible to connect the supply voltage source V either to the supply input 32 of circuit 7 or to the supply input 33 supplying supply voltages to all the circuits of receiver 10 by not shown connections.

The electronic inverter 9 makes it possible to connect an antenna 8 either to the output of circuit 7 or to the signal input 34 of receiver 10.

The signal input 34 of receiver 10 is connected to the input of a demodulator 15 across an input circuit 11 followed by an intermediate frequency amplifier 12 having a gain control input 39.

The output of demodulator 15 is connected to the output 35 of receiver across a second delay device 23 an electronic switch 28 and an amplifier 29 arranged in series, and to the input of a first detection circuit 16. The output of the latter is connected, across an electronic inverter 17 having a control input 38, to the input of one or other of the integrators 18 and 19, whose outputs are connected to the gain control input 39.

The output of amplifier 12 is also connected to the input of a processing circuit 22 across a second detection circuit 20 and a third delay device 21 arranged in series, whose two outputs 36 and 37 respectively supply a first and a second input of a flip-flop 26. The output of flip-flop 26 is connected to a first input of the AND-gate 27, whereof a second input is coupled to the output of the demodulator 15 across a voice-noise discriminator 24. The output of the AND-gate 27 is connected to the control input 38 of the electronic inverter 17 and to the control input of the electronic switch 28.

The system of elements constituted by the flip-flop 26, the processing circuit 22, the third delay device 21, the second detection circuit 20, the voice-noise discriminator 24 and the AND-gate 27 is called the voice activity detection device, whose output is that of the AND-gate 27.

On transmission, the time periods during which voice signals are being introduced to the input 30 of the transmitter will be called transmitter voice activity periods in the remainder of the description and in the claims. Likewise, on reception, the time periods during which voice signals are being received at input 34 of receiver 10 will be called receiver voice activity periods. On transmission, the transmitter voice activity periods are detected by the voice-noise discriminator 2. On reception, the receiver voice activity periods are detected by the voice activity detection device.

The present transceiver functions in the following manner.

The voice-noise discriminator 2 and the voice activity detection device of the receiver respectively supply a first and a second logic signal which are at state 1 when the signals received at their respective inputs are voice signals. The duration of state 1 of said first and second signals is identical to that of the voice signals, but staggered by a time $T_1$ (corresponding to the processing time of the said signals). The first signal is transmitted to the first input of the AND-gate 50, whose second complementary input receives the second signal. The output of the AND-gate 50 supplies a third logic signal of logic level 1 (with a delay $T_1$) only when voice signalling is received at terminal 30 of the transmitter and when the input of the voice activity detection device of the receiver does not receive them. This third logic signal is transmitted to the control input of electronic inverters 6 and 9 which carry out an automatic alternating switching by connecting the antenna 8 and the supply voltage source V respectively to the inputs 32 of circuit 7 during state 1 of the third logic signal and connecting these same elements to inputs 34 and 33 of receiver 10 during state 0 of this third logic signal.

Input 33 symbolises the supply input of all the elements of receiver 10, whilst the connections are not shown in order not to unduly complicate the drawing and description.

This logic signal is also applied to the control input of the electronic switch 4 after a delay $T_2$ equal to the time of establishing the supply voltage of circuit 7 provided by the first delay device 3. The delay line 1 supplies a delay equal to $T_1+T_2$, so that electronic switch 4 is switched on at the same time as a voice signal reaches its input and will remain in this state for the duration of the voice signal. The voice signals transmitted by the electronic switch 4 and then amplified and compressed by amplitude compression means 5 and then transmitted to antenna 8 by circuit 7.

This transmitter supplies voice signals of constant amplitude during the transmitter voice activity period by the action of compressor 5 and supplies no signal (with the exception of the noise of the amplitude compressor) outside these periods.

The signals received at antenna 8 correspond to the signals transmitted by a transmitter similar to the transmitter described before. These signals received at antenna 8 are transmitted to the demodulator 15 across input circuit 11 and intermediate frequency amplifier 12.

The output signals of the amplifier 12 are applied to the input of detection circuit 20, which detects the rapid amplitude transitions and supplies positive and negative pulses respectively for noise to voice signal and voice signal to noise transitions. These pulses are then applied with a delay $T_3$ due to the third delay device 21 to the input of processing circuit 22. The latter supplies a positive pulse at its output 37 when it receives a positive pulse (corresponding to the start of a voice signal received by antenna 8) and supplies it to its output 36 when it receives a negative pulse (corresponding to the end of voice signal received by antenna 8). The signal of output 37 of processing circuit 22 applied to the second input of flip-flop 26 permits the latter to generate at its output a logic signal of state 1, this being maintained there for as long as the signal supplied by output 36 of circuit 22 is not applied to the first input of said flip-flop 26. Thus, the duration of state 1 is equal to the duration of the voice signal received on antenna 8. The second voice-noise discriminator 24 (functioning like discriminator 2) supplies, from voice signals supplied by the output of demodulator 15, a logic signal synchronous to that supplied by flip-flop 26, the delay $T_3$ of the third delay device 21 being equal to the time necessary for synchronising the signals applied to the input of gate 27, i.e. close to the processing time of the output signal of said discriminator 24. The output signal of the latter makes it possible due to the AND-gate 27 to validate the complete duration of state 1 of the output logic signal of flip-flop 26, said signal controlling through the gate the switching on of electronic switch 28. This validation makes it possible to prevent the switching on of the switch in the case of false noise-voice transitions owning to parasitic signals (for example: reception of telegraphic signals). The voice signals supplied at the input of electronic switch 28 are delayed by the second delay device 23 by a time $T_4$ corresponding to the total delay with which said switch ensures the transmission of voice signals from the time where they appear at the output of demodulator 15, $T_4$ being in practice slightly longer than $T_3$. terminal 35 supplies voice signals during the receiver voice activity periods detected by the voice activity detector and no signal outside these periods.

The voice signal supplied by demodulator 15 is detected by detection circuit 16 and then transmitted to the gain control input of amplifier 12 across one of the two integrators 18 and 19, depending on the logic state of the output signal of AND-gate 27, which controls the electronic inverter 17. When the logic control signal of electronic inverter 17 is at state 1, as a consequence of a voice signal present in the reception chain, the output of detection circuit 16 is connected to integrator 18, with a low time constant, in order that the gain control voltage can correct level fluctuations of the signal received due to temporary attenuations linked with transmission. When the logic control signal is at state 0, as a consequence of the absence of voice signals in the reception chain, the gain control signal traverses the integrator 19, with a high time constant in order that the gain of the amplifiers varies slowly periods.

The invention is not limited to the embodiment described and represented and in particular the electronic switch 4 and the first delay device 3 can be eliminated to reduce construction costs.

Such devices can in particular be used in transmission systems.

What is claimed is:

1. A transceiver comprising:
  a transmitter having a signal input and an output for supplying signals only during transmitter voice activity periods, these signals being constant amplitude-modulated signals; and
  a receiver having (1) an input, (2) an output, (3) an amplifier circuit having an input coupled to the input of the receiver and an output, (4) a first electronic switch having a first and a second end respectively coupled to the output of the amplifier circuit and to the output of the receiver and a control input, and (5) a control means for controlling the first switch, said control means comprising detection means for detecting rapid amplitude transitions of received voice signals to provide respective pulses representative of the start and finish of the received voice activity period, having an input coupled to an output of the amplifier circuit, and two outputs for supplying respectively said start and finish received voice activity pulses and a logic circuit having two inputs respectively coupled to the two outputs of the detection means, and an output coupled to the control input of the first switch for switching on the first switch between the start and finish received voice activity pulses, (6) a demodulator with an input and an output respectively coupled to the output of the amplifier circuit and to the first end of the first switch, and (7) an AND gate having a first input coupled to the output of the logic circuit, a second input, and an output coupled to the output of the control means of the first switch, said control means comprising a voice-noise discriminator having an input coupled to the output of the demodulator and an output coupled to the second input of the AND gate, for supplying a signal characteristic of the presence of voice signals, and a delay device in series between the output of the demodulator and the first end of the first switch, the delay time of said delay device being chosen so that the switching on of the first switch coincides with the presence of voice signals at the first end of the first switch, and wherein said detection means comprises a supplementary delay device having a delay time determined in such a way that the overall time constant for the processing of the start and finish received voice activity pulses is equal to that of the discriminator.

2. A transceiver comprising:

a transmitter having a signal input and an output for supplying signals only during transmitter voice activity periods, these signals being constant amplitude-modulated signals; and a receiver having (1) an input, (2) an output, (3) an amplifier circuit having an input coupled to the input of the receiver and an output, (4) a first electronic switch having a first and a second end respectively coupled to the output of the amplifier circuit and to the output of the receiver and a control input, and (5) a control means for controlling the first switch, said control means comprising detection means for detecting rapid amplitude transitions of received voice signals to provide respective pulses representative of the start and finish of the received voice activity period, having an input coupled to the output of the amplifier circuit and two outputs for supplying said respectively start and finish received voice activity pulses, and a logic circuit having two inputs respectively coupled to the two outputs of the detection means, and an output coupled to the control input of the first switch for supplying the switching on of the first switch between the start and finish received voice activity pulses, and (6) a demodulator having an input and an output respectively coupled to the output of the amplifier circuit and to the first end of the first switch, said amplifier circuit having an amplifier with automatic gain control, an input and an output respectively coupled to the input of the receiver and the input of the demodulator, and a gain control input, a first and a second integration circuit, whose respective time constants are separate and predetermined, a second switch having a control input coupled to the output of the control means of the first switch, for coupling the output of the demodulator to the gain control input across one of said integration circuits.

3. Transceiver according to claim 1 or 2, comprising an automatic alternation device having a controlled input coupled to the output of the control means of the first switch.

* * * * *